US006035521A

United States Patent [19]

Schley

[11] Patent Number: 6,035,521

[45] Date of Patent: Mar. 14, 2000

[54] MULTI-DIRECTIONAL CRIMP PLATE

[75] Inventor: Richard Arthur Schley, Warren, Ohio

[73] Assignee: General Motors Corporation, Detroit, Mich.

[21] Appl. No.: 08/972,287

[22] Filed: Nov. 18, 1997

[51] Int. Cl.[7] ..................... B23P 19/00

[52] U.S. Cl. ..................... 29/753; 72/400; 72/399; 72/395; 29/751; 29/515; 29/505

[58] Field of Search ..................... 29/753, 761, 515; 72/412, 416, 466.8, 402

[56] References Cited

U.S. PATENT DOCUMENTS

| | | | |
|---|---|---|---|
| 4,598,570 | 7/1986 | Baldyga | 29/753 |
| 4,854,031 | 8/1989 | Eisenzimmer | 72/402 |
| 4,964,200 | 10/1990 | Giesbrechi et al. | 29/753 |
| 4,989,443 | 2/1991 | Sawdon | 72/402 |
| 4,991,289 | 2/1991 | French | 29/753 |
| 5,335,530 | 8/1994 | Homm | 72/402 |
| 5,353,625 | 10/1994 | Hoshino et al. | 29/753 |
| 5,375,317 | 12/1994 | Murakami et al. | 29/753 |
| 5,414,926 | 5/1995 | Ita et al. | 29/753 |
| 5,500,999 | 3/1996 | Yagi et al. | 29/753 |
| 5,644,944 | 7/1997 | Dischler | 29/751 |
| 5,707,391 | 1/1998 | Carpentieri | 29/753 |

*Primary Examiner*—Lee Young
*Assistant Examiner*—TySean Smith
*Attorney, Agent, or Firm*—Patrick M Griffin

[57] ABSTRACT

A crimping apparatus for crimping a workpiece such as a terminal or eyelet around a core such as a wire or a fiber optic cable. The apparatus includes upper and lower identical plates supported for opposing reciprocal motion on respective upper and lower portions of a press. Each plate includes two crimp segments. Each crimp segment has an impingement surface. All four of the crimp segments are supported for mutually convergent motion relative to one another. The vertical motion of the two plates closing together drives both the vertical and the lateral components of the convergent crimp segment motion. The impingement surfaces of the respective crimp segments form a generally annular composite crimping surface for cooperatively crimping a work piece into an arcuate configuration around a core.

9 Claims, 6 Drawing Sheets

MULTI-DIRECTIONAL CRIMP PLATE

TECHNICAL FIELD

This invention relates generally to a crimping apparatus for crimping terminals, eyelets and the like onto wire cores or fiber optic cable and, more particularly, to such an apparatus configured to crimp the terminals, eyelets, etc. into circular and radial patterns.

INVENTION BACKGROUND

Crimping tools form, bend, and crimp workpieces such as terminals or eyelets onto the ends of wire cores forming crimped assemblies. In mass production such tools may be mounted on presses that bring the tools to bear against the workpieces. Some crimping tools are configured to crimp terminals or eyelets into circular or semi-circular shapes around an insulation jacket or a fiber optic cable. However, although the workpieces are crimped or formed into circular or semi-circular shapes, the press motion and therefore the tooling motion that forms such arcuate shapes is directed linearly along a single axis. In other words, and as shown in FIGS. 1 and 2, prior art crimping tools engage the terminals or eyelets along a single axis—the press motion axis.

This linear uniaxial motion occurs between plate and anvil portions of a crimping tool as shown in FIGS. 1 and 2. The press imparts motion to the assembly by lowering the plate toward the anvil.

It is difficult to design such a linear motion press-driven crimping system to reliably produce large numbers of uniformly circular crimps. The interrelating geometries of each plate, anvil and workpiece must be designed to close each workpiece together into its final arcuate configuration in response to a single linear motion of the plate. The final crimped configuration of a workpiece must be achieved by shaping the plate and/or anvil to complement the desired arcuate workpiece geometry at the end of the press stroke where the tooling is fully closed, i.e. where the plate is closest to the anvil. Therefore, the tooling geometry in such a system is significantly different from that of the unformed, uncrimped workpiece as shown in FIG. 1. As a result, until the tooling reaches the end of the press stroke, it will exert pressure primarily if not exclusively on the ends of open "arms" of a workpiece until the arms have been forced into their final arcuate configuration. This concentration of pressure can dislodge or distort the terminals during the crimping stroke. The pressure concentration can also cause one "arm" of an open workpiece to close before the other arm resulting in an undesirable overlap.

The use of a linear motion press-driven crimping system can also result in non-uniform stresses existing within the geometries of the crimped assemblies—particularly between the workpieces and cores they are crimped on. Intimate contact with uniform stress between workpiece and core is difficult to achieve with this type of system.

Crimped assemblies are sometimes subjected to pull testing to determine the amount of stress induced by such pulling action within the crimped assembly. Especially when dealing with a core of fiber optic cable, it is very important to achieve the lowest possible level of induced stresses at a specified pull force value. Even stress distribution obviously helps reduce the level of induced stress at any single point around the interface between a workpiece and a core in a crimped assembly. The uniformity of these stresses may become even more important when data transmission rates increase to the point where non-uniformity actually diminishes data transmission rate capability of a fiber optic cable.

An example of a linear motion press-driven crimping system is disclosed in U.S. Pat. No. 5,500,999 issued Mar. 26, 1996 to Yagi et al. and shown in FIGS. 1 and 2. As shown in FIGS. 1 and 2, the Yagi et al. patent describes a terminal crimping device that includes an upper plate or die 100 and a lower plate or anvil 102. An open terminal 104 is placed on the lower plate 102 and a wire core 106 is placed in the open terminal 104 with open arms of the terminal extending upward and outward from either side of the wire core 106. The upper plate 100 is pushed downward in vertical alignment with the lower plate 102, bending the open terminal arms inwardly in such a manner as to form a semi-circular arcuate shape around the wire core, embracing and "biting" into the wire. The upper plate 100 includes curved walls 108 that cause the ends of the terminal arms to slide inward as a press (not shown) forces the upper plate 100 linearly downward toward the lower plate 102. As the ends of the terminal arms meet toward the end of the press cycle, the curved walls 108 impart the final arcuate shape to the arms as it forces the arms into their final crimped position.

What is needed is a crimping apparatus that can crimp a workpiece into an arcuate configuration on a core without requiring multiple press cycles or additional tooling parts such as miniature cams and slides. What is also needed is such an apparatus that gives an operator greater control over the location of stresses that are generated between the workpiece and core of a crimped assembly. Still further, a crimping apparatus is needed that is easy to manufacture and can be mounted on existing presses.

INVENTION SUMMARY

In accordance with this invention a crimping apparatus is provided that includes at least three impingement surfaces supported on first and second die plates for mutually convergent motion relative to one another from different directions in response to a single convergent linear motion of the first and second plates to cooperatively crimp a work piece into an arcuate configuration around a core. The plates are supported adjacent one another for convergent linear motion relative to one another. The first plate comprises the first and second spaced impingement surfaces and the second plate comprises the third impingement surface. The third impingement surface is spaced from the first and second impingement surfaces. Arcuate configurations formed according to this invention are advantageous in that they distribute stresses more evenly between the workpiece and core of a crimped assembly. Also, the plates are easy to manufacture and are configured to mount on existing presses as direct replacements for existing tooling that crimps eyelets, ferrules, terminals and other such workpieces into circular and/or radial crimping configurations.

According to another aspect of the invention the impingement surfaces converge and form a generally annular composite crimping surface.

According to another aspect of the invention the second plate comprises a fourth impingement surface spaced from the first, second and third impingement surfaces and supported for mutually convergent motion relative to the first, second and third impingement surfaces.

According to another aspect of the invention the first and second plates are identical.

According to another aspect of the invention the first second, third and fourth impingement surfaces are disposed on respective first, second, third and fourth crimp segments. The first and second crimp segments are supported on a carrier portion of the first plate for lateral motion generally perpendicular to the convergent linear motion of the first and second plates. The third and fourth crimp segments are supported on a carrier portion of the second plate for lateral motion generally perpendicular to the convergent linear motion of the first and second plates and parallel to the lateral motion of the first and second crimp segments.

According to another aspect of the invention two parallel longitudinally rigid and laterally resilient elongated spring members support each crimp segment on its respective carrier portion. The spring members are cantilevered to their respective carrier portions and crimp segments. This forms a parallelogram-shaped structure that maintains each crimp segment in a relatively constant rotational attitude as the springs deform to allow the crimp segments to move laterally. The segments are driven laterally in response to continued convergent linear motion between the plates following engagement of the first and second crimp segments with the respective third and fourth crimp segments.

According to another aspect of the invention the first and second crimp segments each include inner and lower engagement surfaces and the second and third crimp segments each include inner and upper engagement surfaces. The lower engagement surfaces of the first and second crimp segments have profiles complementing profiles of the respective upper engagement surfaces of the third and fourth crimp segments. The lower engagement surfaces of the first and second crimp segments are vertically aligned with the corresponding upper engagement surfaces of the respective third and fourth crimp segments such that the lower engagement surfaces are matingly interlockable with the corresponding upper engagement surfaces when the convergent motion of the plates moves the plates into contact with each other. The inner engagement surfaces of the first and third crimp segments are laterally aligned with the inner engagement surfaces of the second and fourth crimp segments. They are laterally aligned such that the engagement surfaces of the first and third crimp segments are engageable with the inner engagement surfaces of the second and fourth crimp segments. These surfaces engage in response to continued convergent linear plate motion following engagement of the first and second crimp segments with the respective third and fourth crimp segments and resultant yielding of the spring segments to convert vertical convergent plate motion into lateral convergent motion between the interlocked first and third crimp segments and the interlocked second and fourth crimp segments.

According to another aspect of the invention at least one of the plates includes a receptacle configured to mount a positive stop between the plate and at least one of the crimp segments. This limits convergent motion between the plates to accommodate various core and workpiece diameters.

According to another aspect of the invention the spring members are integrally formed with their respective crimp segments as single unitary pieces.

According to another aspect of the invention the crimp segments, spring members and carrier portions of each plate are integrally formed as single unitary pieces.

According to another aspect of the invention the spring members are integrally attached to their respective crimp segments and are removably attachable to their respective plates. This makes the crimp segments removable, replaceable and interchangeable with other crimp segments.

According to another aspect of the invention a fifth impingement surface is disposed between the first and second impingement surfaces and a sixth impingement surface is disposed between the third and fourth impingement surfaces opposite the fifth impingement surface. The fifth and sixth impingement surfaces are supported on the respective first and second plates for co-linear convergent motion relative to one another in response to convergent linear motion of the first and second plates. The fifth and sixth impingement surfaces cooperate with the first, second, third and fourth impingement surfaces to form a continuous arcuate crimping configuration.

According to another aspect of the invention the second plate includes a cavity defined by the third impingement surface and a pair of downwardly and inwardly ramped surfaces. The third impingement surface is disposed between lower ends of the ramped surfaces. The first plate includes first and second cam members pivotally mounted on a carrier portion of the first plate. The first and second impingement surfaces are disposed on the respective first and second cam members. The cam members have respective cam lobes that are engageable with the ramped surfaces to rotate the first and second cam members inward as the first and second plate converge. The inward rotation of the cam members and the convergent motion of the plates cooperate to cause the three impingement surfaces to converge and form a generally annular composite crimping surface.

According to another aspect of the invention the first and second cam members are biased outward. The outward bias causes the cams to reverse and return following each stroke.

According to another aspect of the invention the apparatus comprises first and second plates disposed adjacent one another and supported for convergent motion relative to one another. The first plate comprises first and second spaced impingement surfaces. The second plate comprises third and fourth impingement surfaces spaced from the first and second impingement surfaces. All four impingement surfaces are supported for mutually convergent motion relative to one another in response to a single convergent motion of the first and second plates.

According to another aspect of the invention the first second, third and fourth impingement surfaces are disposed on respective first, second, third and fourth crimp segments. The first and second crimp segments are supported on a carrier portion of the first plate for lateral motion generally perpendicular to the convergent linear motion of the first and second plates. The third and fourth crimp segments are supported on a carrier portion of the second plate for lateral motion generally perpendicular to the convergent linear motion of the first and second plates and parallel to the lateral motion of the first and second crimp segments.

BRIEF DRAWING DESCRIPTION

To better understand and appreciate the invention, refer to the following detailed description in connection with the accompanying drawings.

PREFERRED EMBODIMENT DESCRIPTION

Figure 1:
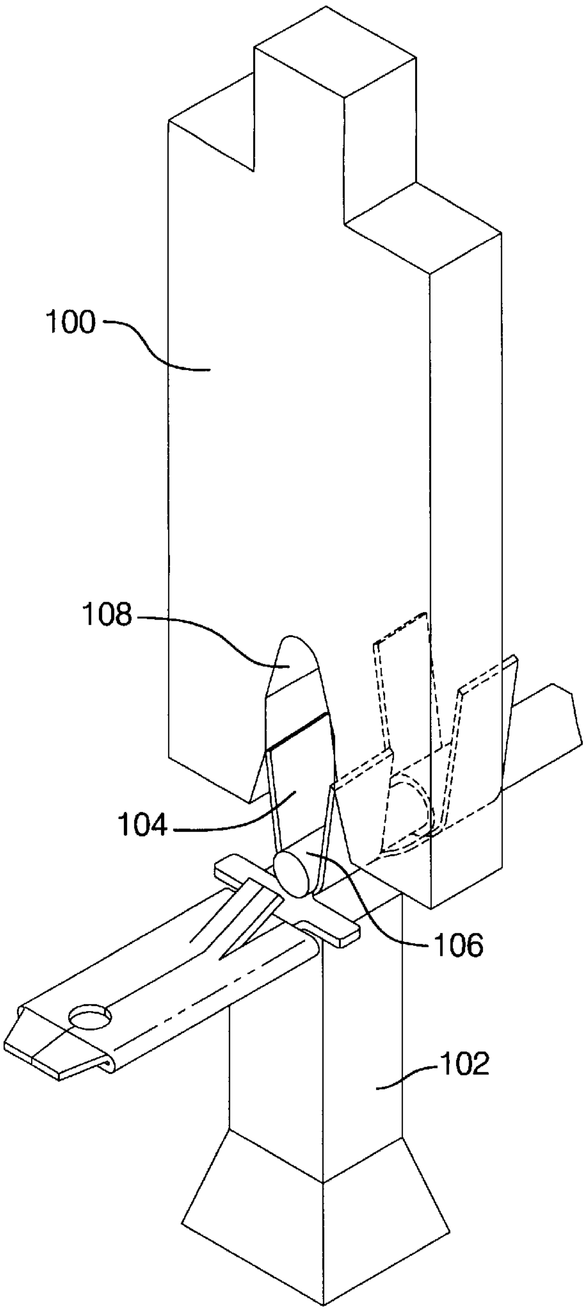
FIG. 1 is a perspective view of a prior art crimping apparatus positioned to crimp a terminal onto the end of a wire.
Figure 2:
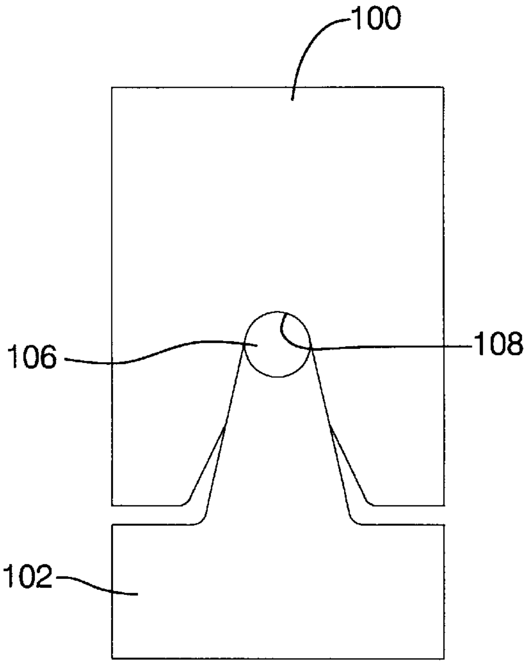
FIG. 2 is a front view of the crimping apparatus of FIG. 1 in a crimped position.
Figure 3:
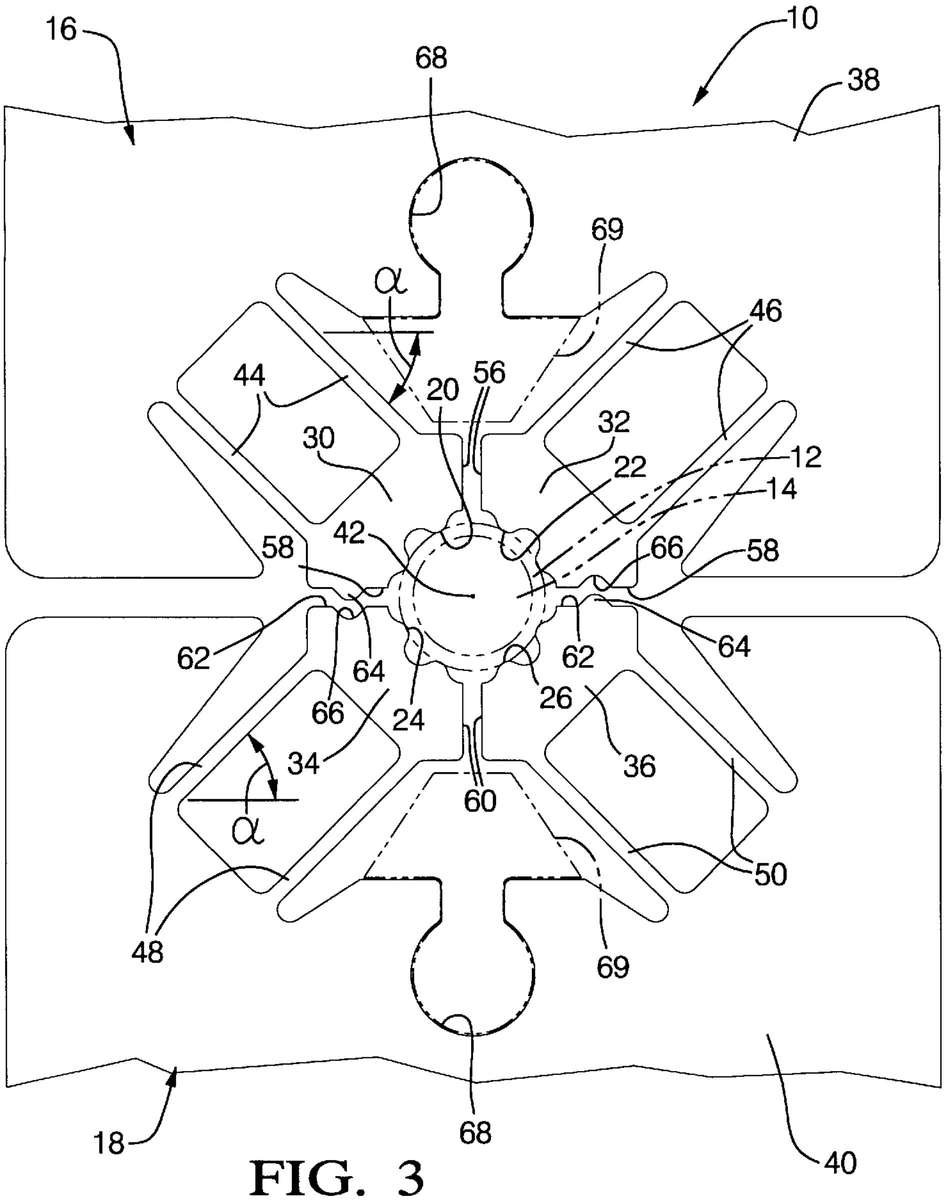
FIG. 3 is a fragmentary front view of a crimping apparatus constructed according to a first embodiment of the present invention.
Figure 4D:
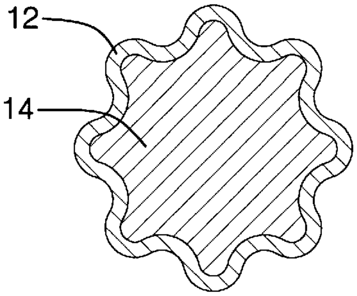
FIG. 4D is an enlarged cross section of a crimp produced by the apparatus shown in FIGS. 3, 4A, 4B and 4C.
Figure 4C:
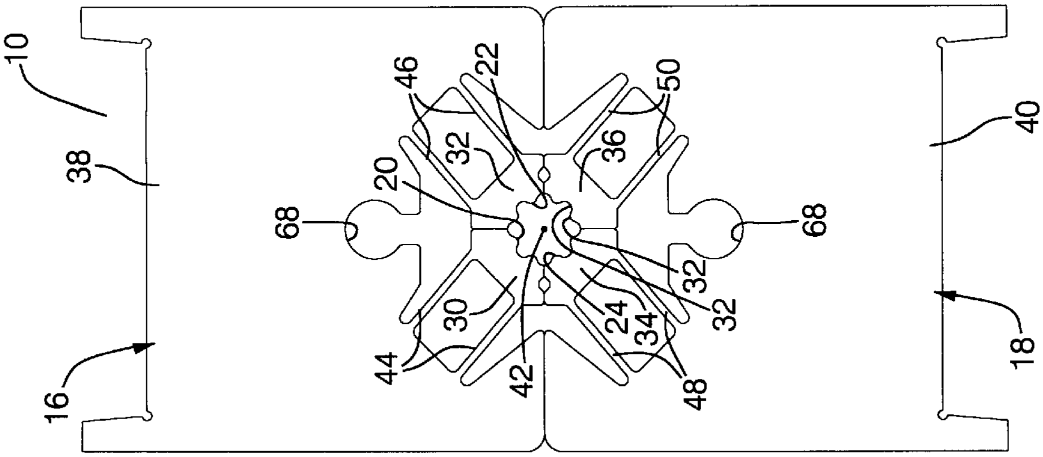
FIG. 4C is a front view of the crimping apparatus of FIG. 3 with the crimp segments vertically interlocked and horizontally engaged forming a composite circumferential crimping surface.
Figure 4B:
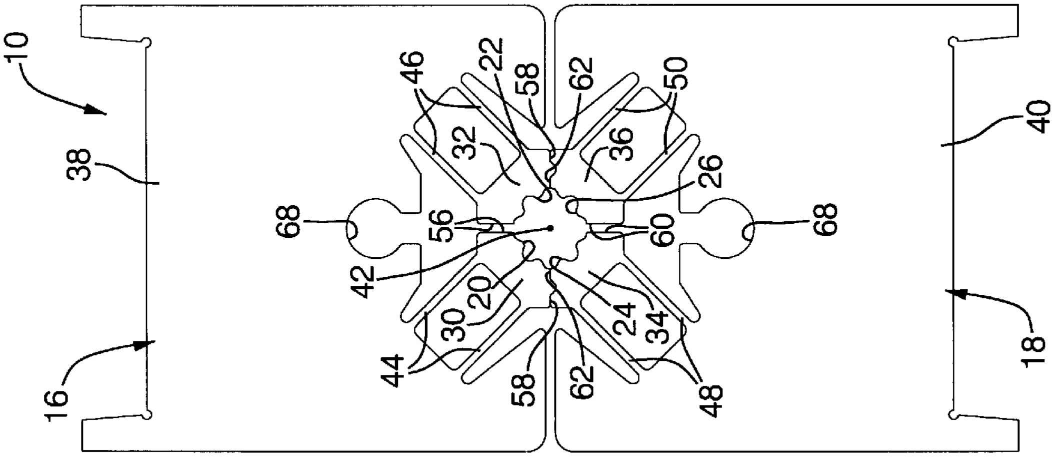
FIG. 4B is a front view of the crimping apparatus of FIG. 3 with the crimp segments vertically interlocked and horizontally spaced.
Figure 4A:
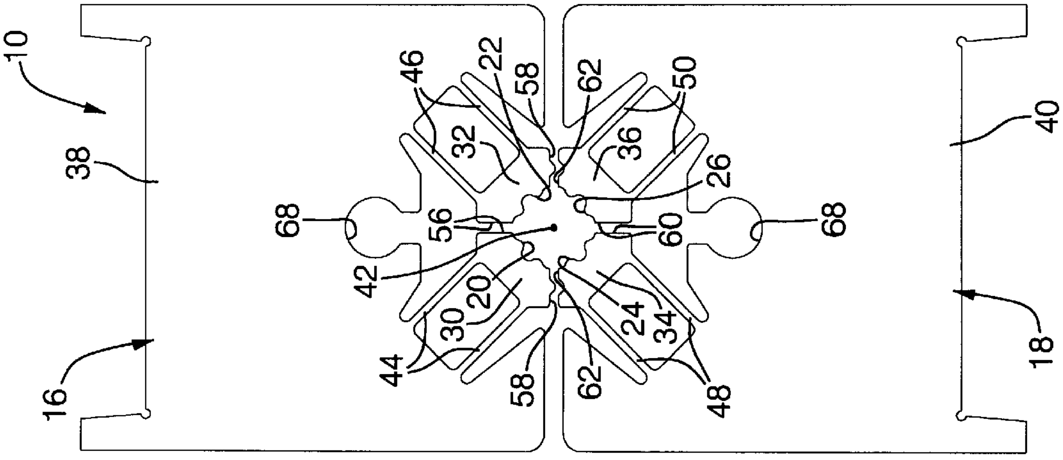
FIG. 4A is a front view of the crimping apparatus of FIG. 3 with all four crimp segments spaced vertically and horizontally from one another.
Figure 5:
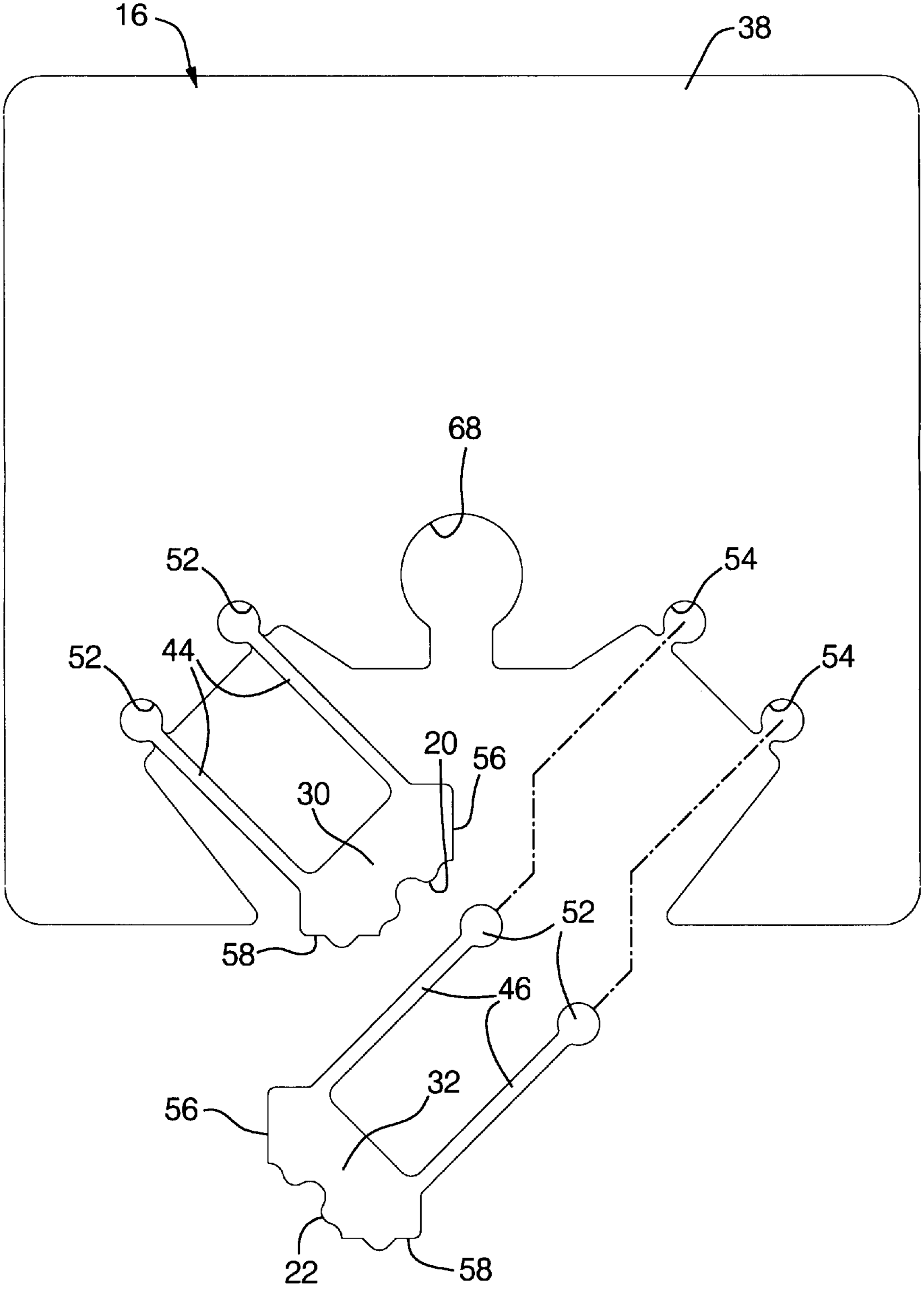
FIG. 5 is a front view of a single crimping plate of a crimping apparatus constructed according to the first embodiment of the present invention having removable crimp segments with one crimp segment removed.

A crimping apparatus constructed according to the present invention is generally shown at 10 in FIGS. 3–5 and represents a first embodiment of the invention. A second embodiment is generally indicated at **10*a* in FIGS. 6A–C, a third embodiment at 10*b* in FIGS. 7A–C and a fourth embodiment at 10*c* in FIGS. 8A and 8B. Reference numerals with the suffix "a" in FIGS. 6A–C, the suffix "b" in FIGS. 7A–C and the suffix "c" in FIGS. 7A and 7B indicate alternative configurations of elements that also appear in the first embodiment. Unless indicated otherwise, where a portion of the following description uses a reference numeral to refer to the figures, I intend that portion of the description to apply equally to elements designated by the suffix "a" in FIGS. 6A–C, the suffix "b" in FIGS. 7A–C and the suffix "c" in FIGS. 8A and 8**B.

As shown in FIG. 3, the crimping apparatus 10 is configured to crimp a workpiece 12 such as a terminal, eyelet or collar around a core 14 such as a wire, or a core or jacket of an electric or fiber optic cable between a pair of identical plates. As shown in FIGS. 3 and 4A–C, a first plate 16, the "upper" plate or anvil, and a second or "lower" plate 18 are configured to be mounted on a press (not shown). The second plate 18 is disposed adjacent and opposite the first plate 16. The first and second plate 18*s* are supported on respective moving and non-moving portions of the press for reciprocal linear motion toward and away from one another.

The first plate 16 comprises first and second spaced impingement surfaces shown at 20 and 22 in FIGS. 3 and 4A–C. The second plate 18 comprises third and fourth impingement surfaces 24 and 26 spaced from the first and second impingement surfaces 20 and 22 and from each other. The four impingement surfaces 20, 22, 24 and 26 are supported on their respective plates 16 and 18 for mutually convergent motion relative to one another. In other words, the four impingement surfaces 20, 22, 24 and 26 are supported in such a way that they are free to move from a position remote from one another, from four different coplanar directions and converging to a location where all four surfaces 20, 22, 24 and 26 meet end-to-end forming a composite annular crimping surface 28.

As shown sequentially in FIGS. 4A–C, the mutually convergent motion is imparted to the impingement surfaces 20, 22, 24 and 26 in response to a single convergent linear motion of the first and second plates 16 and 18. The converging impingement surfaces 20, 22, 24 and 26 are configured to cooperatively crimp a work piece 12 into an arcuate configuration around a core 14. The final arcuate configuration of a work piece 12 crimped by the crimping apparatus 10 of the first embodiment is a circular ring of sinusoidal lobes as shown in FIG. 4D. Other impingement surface configurations may form other arcuate configurations that are, for example circular, semi-circular or elliptical. Such arcuate crimping configurations, when formed according to the invention, distribute stresses more evenly between the workpiece 12 and core 14 of a crimped assembly; the impingement surfaces 20, 22, 24 and 26 converging and forming a generally annular composite crimping surface as shown at 28 in FIG. 4C.

Plates 16 and 18 constructed according to the invention are easy to manufacture as they can be made with a wire electrical discharge machine process from a sheet of hardened tool steel plate. Moreover, the plates 16 and 18 are configured as shown in the FIGS. 4A, 4B and 4C to mount on existing presses as direct replacements for existing tooling that crimps eyelets, ferrules, terminals and other such workpieces into circular and/or radial crimping configurations.

The first second, third and fourth impingement surfaces 20, 22, 24 and 26 are disposed on respective first, second, third and fourth crimp segments 30, 32, 34 and 36 as shown in FIGS. 3 and 4A–C. The first and second crimp segments (or quadrants) 30 and 32 are supported on a carrier portion 38 of first plate 16 for lateral or horizontal motion generally perpendicular to the convergent vertical linear motion of the first and second plates 16 and 18. The third and fourth crimp segments 34 and 36 are supported on a carrier portion 40 of second plate 18 for lateral motion generally perpendicular to the convergent linear motion of the first and second plates 16 and 18 and parallel to the lateral motion of the first and second crimp segments 30 and 32. As is best shown in sequential FIGS. 4A–C, each crimp segment 30–34 is configured to move toward a common center point 42, closing onto a workpiece 12 from four different directions.

As shown in FIGS. 3 and 4A–C, four pairs of parallel, longitudinally rigid and laterally resilient elongated spring members 44, 46, 48 and 50 support each respective crimp segment 30, 32, 34 and 36 on its respective carrier portion 38 or 40. The spring members 44, 46, 48 and 50 are integrally formed, with their respective crimp segments 30, 32, 34 and 36 and carrier portions 38 and 40 as single unitary pieces. The pairs of spring members 44, 46, 48 and 50 are cantilevered to their respective carrier portions 38 and 40 and crimp segments 30, 32, 34 and 36 forming a parallelogram-shaped structure. This structure maintains a relatively constant rotational attitude as it deforms to allow the crimp segments 30, 32, 34 and 36 to move laterally in response to continued convergent linear motion between the plates following engagement of the first and second crimp segments 30 and 32 with the respective third and fourth crimp segments 34 and 36.

As representatively shown in FIG. 5, the pairs of spring members 44, 46, 48 and 50 may be releasably attached to their respective carrier portions 38 and 40 making the crimp segments 30, 32, 34 and 36 and their associated pairs of spring members 44, 46, 48 and 50 readily interchangeable and replaceable. In other words, the pairs of spring members 44, 46, 48 and 50 may be integrally attached to their respective crimp segments 30, 32, 34 and 36 and removably attached to their respective carrier portions 38 and 40. More specifically, the distal ends of each pair of spring members 44, 46, 48 and 50 may be formed to include a circular enlarged portion 52. The carrier portions 38, 40 may be formed to include semi-circular recesses 54 shaped to receive the circular enlarged portions 52 of the pairs of spring members. Releasable spring attachment makes the crimp segments 30, 32, 34 and 36 removable, replaceable and interchangeable with other crimp segments having differently configured impingement surfaces for producing different radial crimp profiles in a workpiece 12.

The preferred spring angle "α" from horizontal can be determined from the following equations for given values of desired vertical displacement (V), desired horizontal displacement (H), and spring length (R). Vertical displacement (V) is the desired amount of vertical movement for each crimp segment following the engagement of the first and second crimp segments 30, 32 with the third and fourth crimp segments 34, 36 during a downward stroke of the press. Horizontal displacement (H) is the desired amount of horizontal movement for each crimp segment following the engagement of the first and second crimp segments 30, 32 with the third and fourth crimp segments 34, 36 during a downward stroke of the press.

$$B = 2 \times \left[\sin^{-1}\left(\frac{R\sqrt{H^2+V^2}}{2}\right)\right]$$

$$\alpha = B + \left[90 - \left[\sin^{-1}\left(\frac{R\sqrt{H^2+V^2}}{2}\right)\right] - \tan^{-1}\left(\frac{V}{H}\right)\right]$$

As is best shown in FIG. 3, the first and second crimp segments 30, 32 each include inner and lower engagement surfaces 56, 58. Likewise, the third and fourth crimp segments 34, 36 each include inner and upper engagement surfaces 60, 62. The lower engagement surfaces 58 of the first and second crimp segments 30, 32 have profiles complementing profiles of the respective upper engagement surfaces 62 of the third and fourth crimp segments 34, 36. More specifically, the lower engagement surface of the first crimp segment 30 and the upper engagement surface of the fourth crimp segment 36 each include integrally extending male lobes shown at 64 in FIG. 3. Complementing these lobes 64, the upper engagement surface of the third crimp segment 34 and the lower engagement surface of the second crimp segment 32 include female recesses, as shown at 66 in FIG. 3, shaped to receive the male lobes.

The lower engagement surfaces 58 of the first and second crimp segments 30, 32 are vertically aligned with the corresponding upper engagement surfaces 62 of the respective third and fourth crimp segments 34, 36 such that the lower engagement surfaces matingly interlock with the corresponding upper engagement surfaces when the convergent motion of the plates 16, 18 moves the plates into contact with each other. The upper and lower engagement surfaces 58, 62 meet first as the plates 16, 18 close together and lock together so that the spring members 44–50 can cover the remaining vertical convergent plate motion into lateral convergent crimp segment motion. The first and third crimp segments 30, 34 and the second and fourth crimp segments 32, 36 are locked together by their interlocking complementary profiles so that they will move inward together and bring crimping pressure to bear on a workpiece 12 at the same time. In other words, engagement of the first and second crimp segments 30, 32 with the respective third and fourth crimp segments 34, 36 and resultant yielding of the spring members 44–50 converts vertical convergent plate motion into lateral convergent motion between the interlocked first and third crimp segments 30, 34 and the interlocked second and fourth crimp segments 32, 36.

The inner engagement surfaces of the first and third crimp segments 30, 34 are laterally aligned with the inner engagement surfaces of the second and fourth crimp segments 32, 36. The inner engagement surfaces 56, 60 are aligned such that the lateral convergent crimp segment motion causes the inner engagement surfaces of the first and third crimp segments 30, 34 to engage the inner engagement surfaces of the second and fourth crimp segments 32, 36.

Each of the plates 16, 18 includes a semi-circular positive stop receptacle 68. Each positive stop receptacle 68 is configured to mount an optional positive stop 69 (shown in phantom) in a position between the carrier portion 38, 40 of the plate 16, 18 and at least one of the crimp segments 30, 32, 34 and 36. The optional positive stop 69 can be shaped to limit the vertical and/or lateral motion of one or more of the crimp segments 30, 32, 34 and 36.

The first embodiment of the present invention achieves four-quadrant constriction of a terminal using only one axis of movement, while maintaining compatibility with existing press arrangements and current production methods.

Figure 6C:
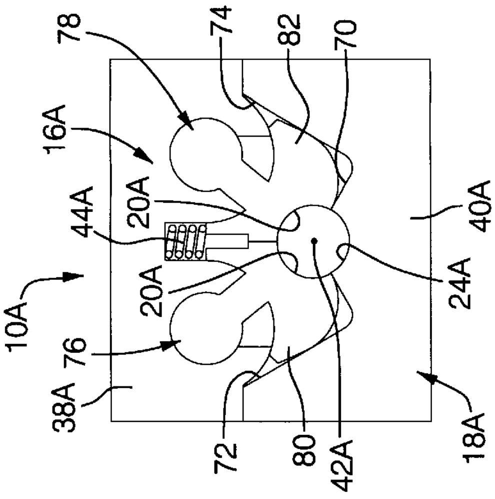
FIG. 6C is a front view of the crimping apparatus of FIG. 6A with the three impingement surfaces joined into a composite circumferential crimping surface.
Figure 6B:
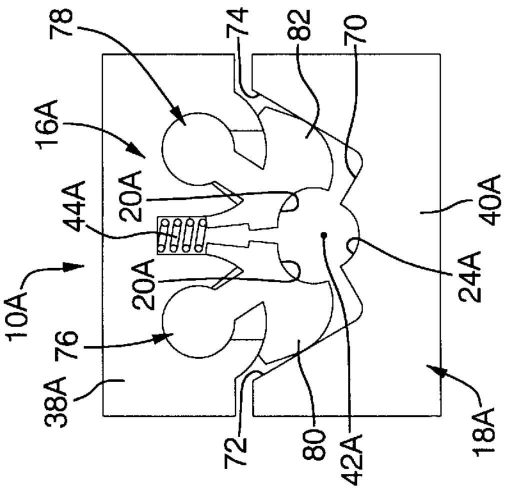
FIG. 6B is a front view of the crimping apparatus of FIG. 6A with the three impingement surfaces moving closer to a crimped position.
Figure 6A:
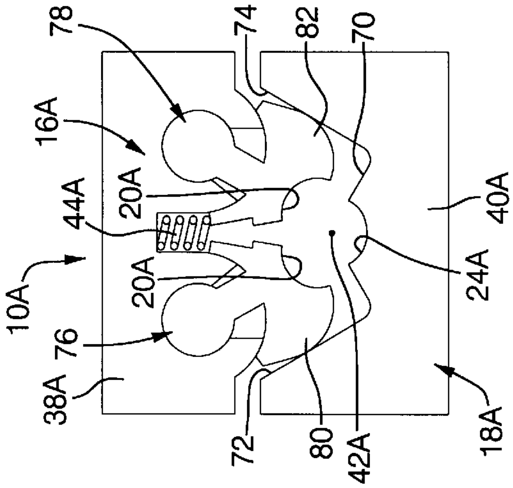
FIG. 6A is a front view of a crimping apparatus constructed according to a second embodiment of the present invention having three impingement surfaces and shown in a pre-crimped position with impingement surfaces spaced apart.

According to a second embodiment of the present invention generally shown at 10*a* in FIGS. 6A–C, the second plate 18*a* includes a cavity 70 defined by the third impingement surface 24*a* and a pair of downwardly and inwardly ramped surfaces 72, 74. The third impingement surface 24*a* is disposed between and blends with lower ends of the ramped surfaces 72, 74. The first plate 16*a* includes first and second cam members 76, 78 pivotally suspended from a carrier portion 38*a* of the first plate 16. The first and second impingement surfaces 20*a*, 22*a* are disposed on the respective first and second cam members 76, 78. The cam members have respective cam lobes 80, 82 that engage the ramped surfaces 72, 74 to rotate the first and second cam members 76, 78 laterally inward as the first and second plate 18*a* vertically converge. The inward rotation of the cam members 76, 78 and the vertical convergent motion of the plates 16*a*, 18*a* cooperate to cause the three impingement surfaces 20*a*–24*a* to converge and form a generally annular composite crimping surface 28*a*. The first and second cam members 76, 78 are biased outward by a spring 44*a* disposed between the respective cam members and the carrier portion 38*a* of the first plate 16*a*. A crimping apparatus constructed according to the second embodiment of the present invention achieves constriction of a workpiece 12 from three different directions using only one axis of press movement, while still maintaining compatibility with existing press arrangements and current production methods.

Figure 7C:
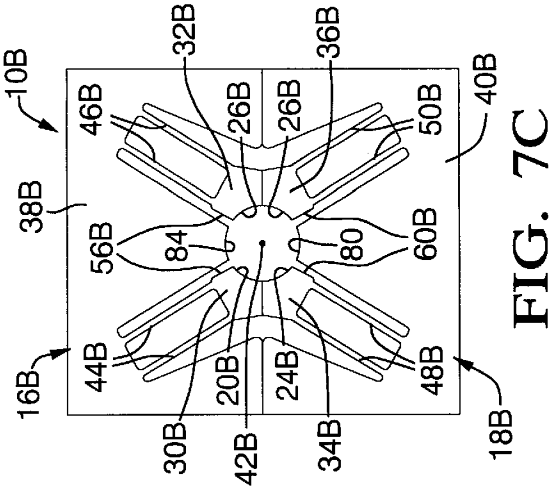
FIG. 7C is a front view of the crimping apparatus of FIG. 7B with the two pairs of joined impingement surfaces spaced closer to the remaining two impingement surfaces.
Figure 7B:
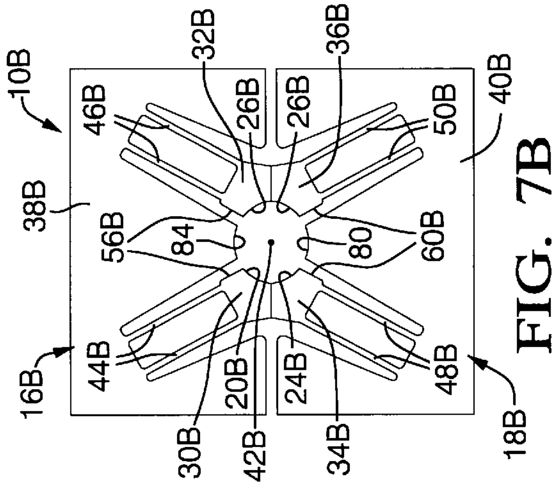
FIG. 7B is a front view of the crimping apparatus of FIG. 7A with four of the impingement surfaces joined into pairs.
Figure 7A:
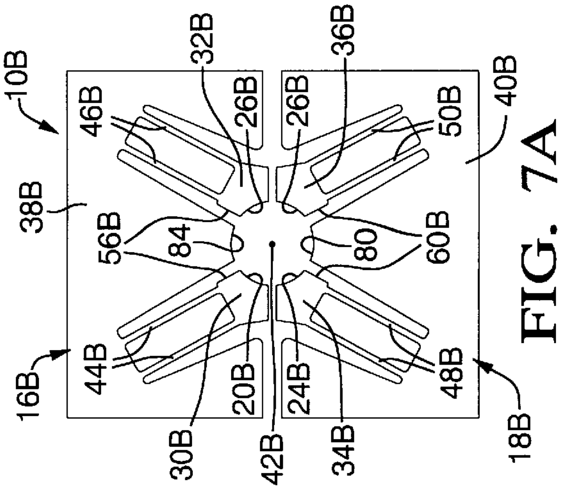
FIG. 7A is a front view of a crimping apparatus constructed according to a third embodiment of the invention with six impingement surfaces spaced vertically and horizontally from each other.

According to a third embodiment of the present invention generally shown at 10*b* in FIGS. 7A–C, a fifth impingement surface 84 is disposed between the first and second impingement surfaces 20*b,* 22*b* and a sixth impingement surface 86 is disposed between the third and fourth impingement surfaces 24*b,* 26*b* opposite and directly below the fifth impingement surface 84. The fifth and sixth impingement surfaces are rigidly supported on the respective first and second plates 16*b,* 18*b* for co-linear convergent motion relative to one another. Accordingly, the fifth and sixth impingement surfaces 84, 86 cooperate and converge together with the first, second, third and fourth impingement surfaces 20*b*–26*b* to form a continuous arcuate crimping configuration. In other words, the fifth and sixth impingement surfaces 84, 86 converge vertically as the four crimp segments 30*b,* 32*b,* 34*b,* and 36*b* converge both vertically and laterally, carrying the other impingement surfaces 20*b,* 22*b,* 24*b* and 26*b* into a position where all six impingement surfaces form a composite arcuate crimping surface.

Figure 8B:
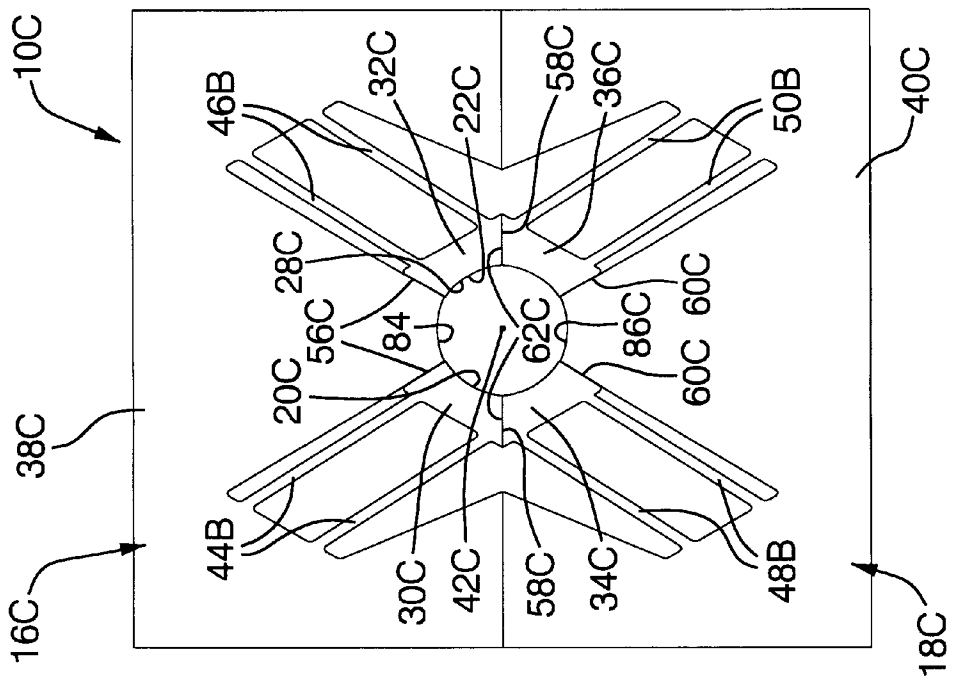
FIG. 8B is a front view of the crimping apparatus of FIG. 8A showing the six impingement surfaces joined into a composite circumferential crimping surface.
Figure 8A:
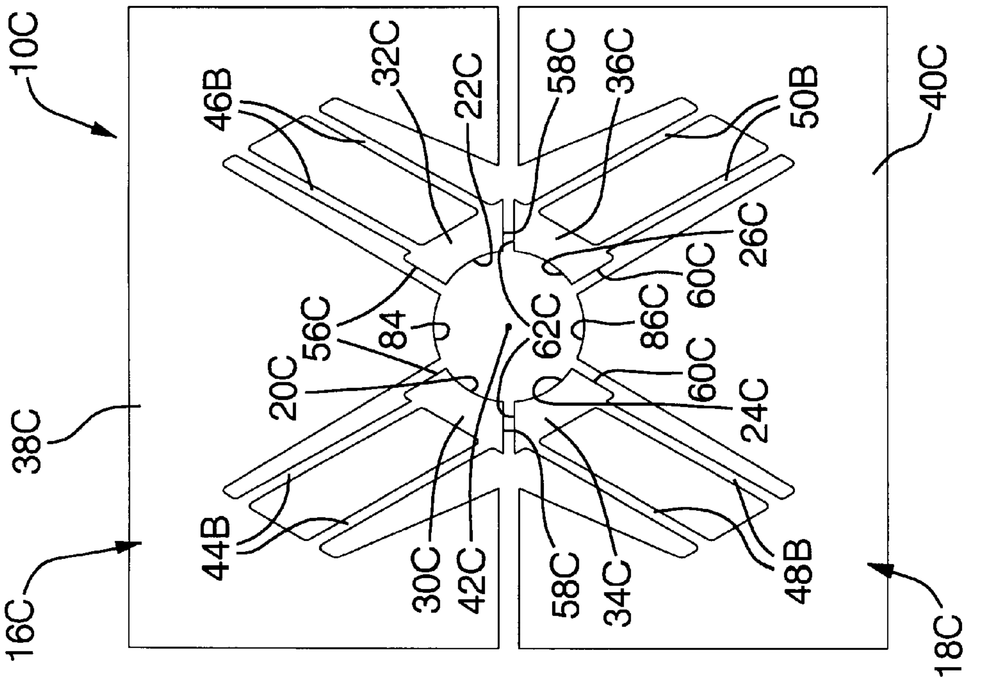
FIG. 8A is a front view of a crimping apparatus constructed according to a fourth embodiment of the present invention and showing six spaced-apart impingement surfaces.

FIGS. 8A and 8B show respective open and closed positions of a crimping apparatus 10 constructed according to a fourth embodiment of the invention. The fourth embodiment is the same as the third embodiment except that FIGS. 8A and 8B show another method of controlling the vertical displacement compared to the horizontal displacement which are determined by the spring angle $\alpha$ and the spring length. In FIGS. 8A and 9B the spring orientation is designed in a parallelogram configuration instead of the rectangular configuration of FIGS. 7A–7C.

The third and fourth embodiments of the present invention achieve constriction of a workpiece 12 from six different directions using only one axis of press movement, while still maintaining compatibility with existing press arrangements and current production methods.

In other embodiments, the number of impingement surfaces could be greater than six. Also, the thickness of the first and second plates may be of any thickness necessary to accommodate the various lengths of different terminals, ferrules, eyelets, rings and the like.

Each of the above embodiments teaches means to obtain an arcuate or circular, constrictive type of crimping action that leaves predictable and even stresses in the assembled part.

The description and drawings illustratively set forth my presently preferred invention embodiments. I intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

I claim:

1. A crimping apparatus for crimping a workpiece around a core comprising:

a first plate;

a second plate disposed adjacent the first plate, the first and second plates supported for convergent linear motion relative to one another;

first and second spaced impingement surfaces disposed on respective first and second crimp segments of the first plate;

third and fourth impingement surfaces disposed on respective third and fourth crimp segments of the second plate and spaced from the first and second impingement surfaces, the impingement surfaces supported for mutually convergent motion relative to one another in response to a single convergent linear motion of the first and second plates to converge and form a generally annular composite crimping surface and cooperatively crimp a work piece into a generally arcuate configuration around a core, the first and second crimp segments being supported on a carrier portion of the first plate for lateral motion generally perpendicular to the convergent linear motion of the first and second plates, the third and fourth crimp segments being supported on a carrier portion of the second plate for lateral motion generally perpendicular to the convergent linear motion of the first and second plates and parallel to the lateral motion of the first and second crimp segments; and two parallel longitudinally rigid and laterally resilient elongated spring members supporting each crimp segment on its respective carrier portion, the spring members being cantilevered to their respective carrier portion, the spring members being cantilevered to their respective carrier portions and crimp segments.

2. A crimping apparatus as defined in claim 1 in which:

the first and second crimp segments each include inner and lower engagement surfaces;

the second and third crimp members each include inner and upper engagement surfaces;

the lower engagement surfaces of the first and second crimp segments have profiles complementing profiles of the respective upper engagement surfaces of the third and fourth crimp segments, the lower engagement surfaces of the first and second crimp segments being vertically aligned with the corresponding upper engagement surfaces of the respective third and fourth crimp segments such that the lower engagement surfaces are matingly interlockable with the corresponding upper engagement surfaces when the convergent motion of the plates moves the plates into contact with each other;

the inner engagement surfaces of the first and third crimp segments are laterally aligned with the inner engagement surfaces of the second and fourth crimp segments such that the engagement surfaces of the first and third crimp segments are engageable with the inner engagement surfaces of the second and fourth crimp segments in response to continued convergent linear motion between the plates following engagement of the first and second crimp segments with the respective third and fourth crimp segments and resultant yielding of the spring segments to convert vertical convergent plate motion into lateral convergent motion between the interlocked first and third crimp segments and the interlocked second and fourth crimp segments.

3. A crimping apparatus as defined in claim 1 in which at least one of the plates includes a receptacle configured to mount a positive stop between the plate and at least one of the crimp segments.

4. A crimping apparatus as defined in claim 1 in which the spring members are integrally formed with their respective crimp segments as single unitary pieces.

5. A crimping apparatus as defined in claim 1 in which the crimp segments, spring members and carrier portions of each plate are integrally formed as single unitary pieces.

6. A crimping apparatus as defined in claim 1 in which the spring members are integrally attached to their respective crimp segments and are removably attachable to their respective plates.

7. A crimping apparatus as defined in claim 2 in which:

a fifth impingement surface is disposed between the first and second impingement surfaces;

a sixth impingement surface is disposed between the third and fourth impingement surfaces opposite the fifth impingement surface; and the fifth and sixth impingement surfaces are supported on the respective first and second plates for co-linear convergent motion relative to one another in response to convergent linear motion of the first and second plates, the fifth and sixth impingement surfaces cooperating with the first, second, third and fourth impingement surfaces to form a continuous arcuate crimping configuration.

8. A crimping apparatus for crimping a workpiece around a core comprising:

a first plate, a second plate disposed adjacent the first plate, the first and second plates supported for convergent linear motion relative to one another;

the first plate comprising first and second spaced impingement surfaces;

the second plate comprising a third impingement surface spaced from the first and second impingement surfaces;

the impingement surfaces supported for mutually convergent motion relative to one another in response to a single convergent linear motion of the first and second plates to cooperatively crimp a work piece into a generally arcuate configuration around a core;

the impingement surfaces converging and forming a generally angular composite crimping surface;

the second plate including a cavity defined by the third impingement surface and a pair of downwardly and inwardly ramped surfaces, the third impingement surface being disposed between and blending with lower ends of the ramped surfaces; and the first plate including first and second cam members pivotally mounted on a carrier portion of the first plate, the first and second impingement surfaces being disposed on the respective first and second cam members, the cam members having respective cam lobes engageable with the ramped surfaces to rotate the first and second cam members inward as the first and second plate converge, the inward rotation of the cam members and the convergent motion of the plates cooperating to cause the three impingement surfaces to converge and form a generally annular composite crimping surface.

9. A crimping apparatus as defined in claim 8 in which the first and second cam members are biased outward.

* * * * *